(12) United States Patent
Sharma et al.

(10) Patent No.: US 10,594,621 B2
(45) Date of Patent: Mar. 17, 2020

(54) MANAGING VIRTUALIZED NETWORK SERVICE BUNDLES

(71) Applicant: HEWLETT PACKARD ENTERPRISE DEVELOPMENT LP, Houston, TX (US)

(72) Inventors: Puneet Sharma, Palo Alto, CA (US); Amit Kumar Sheoran, Palo Alto, CA (US); Vinay Saxena, Richardson, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 260 days.

(21) Appl. No.: 15/646,070

(22) Filed: Jul. 10, 2017

(65) Prior Publication Data

US 2019/0014056 A1   Jan. 10, 2019

(51) Int. Cl.
G06F 15/173 (2006.01)
H04L 12/923 (2013.01)
H04L 12/725 (2013.01)

(52) U.S. Cl.
CPC ............ *H04L 47/762* (2013.01); *H04L 45/30* (2013.01); *H04L 45/306* (2013.01)

(58) Field of Classification Search
CPC ...... H04L 47/762; H04L 45/30; H04L 45/306
USPC ........................................................ 709/226
See application file for complete search history.

(56) References Cited

U.S. PATENT DOCUMENTS

| 9,258,237 | B1 * | 2/2016 | Smith ................. H04L 12/4633 |
| 2014/0207918 | A1 * | 7/2014 | Kowalski ............ H04L 41/0803 709/220 |
| 2014/0207919 | A1 * | 7/2014 | Kowalski ............ H04L 41/0896 709/220 |
| 2015/0215172 | A1 | 7/2015 | Kumar et al. |

(Continued)

FOREIGN PATENT DOCUMENTS

WO   WO-2017020949   2/2017

OTHER PUBLICATIONS

Amit Sheoran, "Contain-ed: NFV Micro-Service System for Containing e2e Latency," In Proceedings of HotConNet, 6 pp., Aug. 2017.

(Continued)

*Primary Examiner* — Imad Hussain
(74) *Attorney, Agent, or Firm* — Hewlett Packard Enterprise Patent Department (57) ABSTRACT

Examples provided herein describe a method for managing virtualized network service bundles. For example, a physical processor may implement machine readable instructions to receive a first data packet in a virtual network, determine a first type of the first data packet, determine a first active virtualized network service bundle instance associated with a first virtualized network service bundle that handles the first type of data packet, and direct the first data packet to the first active virtualized network service bundle instance. In some examples, the first virtualized network service bundle may comprise a first set of virtual network functions, and the first virtualized network service bundle may be associated with a set of active virtualized network service bundles instances, where the set of active virtualized network service bundle instances may comprise the first active virtualized network service bundle instance.

20 Claims, 5 Drawing Sheets

(56) References Cited

U.S. PATENT DOCUMENTS

| | | | |
|---|---|---|---|
| 2016/0050161 A1* | 2/2016 | Da | H04L 47/783 709/226 |
| 2016/0139939 A1* | 5/2016 | Bosch | H04L 67/10 718/1 |
| 2016/0156513 A1 | 6/2016 | Zhang et al. | |
| 2016/0261495 A1* | 9/2016 | Xia | H04L 45/58 |
| 2016/0337329 A1* | 11/2016 | Sood | H04L 63/08 |
| 2017/0093721 A1* | 3/2017 | Kano | H04L 47/122 |
| 2017/0104679 A1* | 4/2017 | Sunavala | G06F 9/45558 |
| 2017/0230257 A1* | 8/2017 | Bruun | G06F 9/44505 |
| 2017/0318097 A1* | 11/2017 | Drew | H04L 67/16 |
| 2017/0371692 A1* | 12/2017 | Connolly | G06F 9/45558 |
| 2018/0091420 A1* | 3/2018 | Drake | H04L 67/327 |
| 2018/0152507 A1* | 5/2018 | Rosenberg | H04L 41/0803 |
| 2018/0199218 A1* | 7/2018 | Ashrafi | H04W 24/04 |
| 2019/0007320 A1* | 1/2019 | Sukhomlinov | H04L 47/125 |
| 2019/0190795 A1* | 6/2019 | Kim | H04L 41/5041 |

OTHER PUBLICATIONS

Gupta, L.et al., "COLAP: A Predictive Framework For Service Function Chain Placement In A Multi-Cloud Environment", The 7th IEEE Annual Computing and Communication Workshop and Conference (CCWC), Jan. 9-11, 2017, 9 pages.

Martini, B. et al., A Service-Oriented Approach For Dynamic Chaining Of Virtual Network Functions Over Multi-Provider Software-Defined Networks, Future ZInternet 2016, MDPI, Jun. 1, 2016, 21 pages.

A. S. Rajan et al., "Understanding the bottlenecks in virtualizing cellular core network functions," The 21st IEEE International Workshop on Local and Metropolitan Area Networks, Beijing, 2015, 6 pages.

Basta et al., "Applying NFV and SDN to LTE mobile core gateways, the functions placement problem", In Proceedings of the 4th workshop on All things cellular: operations, applications, & challenges (AllThingsCellular '14), 2014, 6 pages.

Fontenla-Gonzalez et al., "Lightweight container-based OpenEPC deployment and its evaluation," IEEE NetSoft Conference and Workshops (NetSoft), 2016.

Hawilo et al., "NFV: state of the art, challenges, and implementation in next generatio n mobile networks (vEPC)," IEEE Network, vol. 28, 2014, 13 pages.

Kablan et al., "Stateless Network Functions", Proceedings of the 2015 ACM SIGCOMM Workshop on Hot Topics in Middleboxes and Network Function Virtualization, 2015, pp. 49-54.

Katsalis et al., "5G Architectural Design Patterns," IEEE International Conference on Communications Workshops (ICC), 2016, 6 pages.

Taleb et al., "EASE: EPC as a service to ease mobile core network deployment over cloud", in IEEE Network, vol. 29, No. 2, Mar.-Apr. 2015, pp. 78-88.

* cited by examiner

MANAGING VIRTUALIZED NETWORK SERVICE BUNDLES

BACKGROUND

Network Functions Virtualization ("NFV") has enabled dynamic placement and allocation of resources for network services in order to match workload requirements. NFV relies on commercial off the shelf hardware and data center connectivity to dynamically deploy network services in virtualized manner.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for managing virtualized network service bundles. The disclosed examples may include systems, devices, computer-readable storage media, and methods for managing virtualized network service bundles. For purposes of explanation, certain examples are described with reference to the components illustrated in FIGS. 1-5. The functionality of the illustrated components may overlap, however, and may be present in a fewer or greater number of elements and components.

Figure 3:
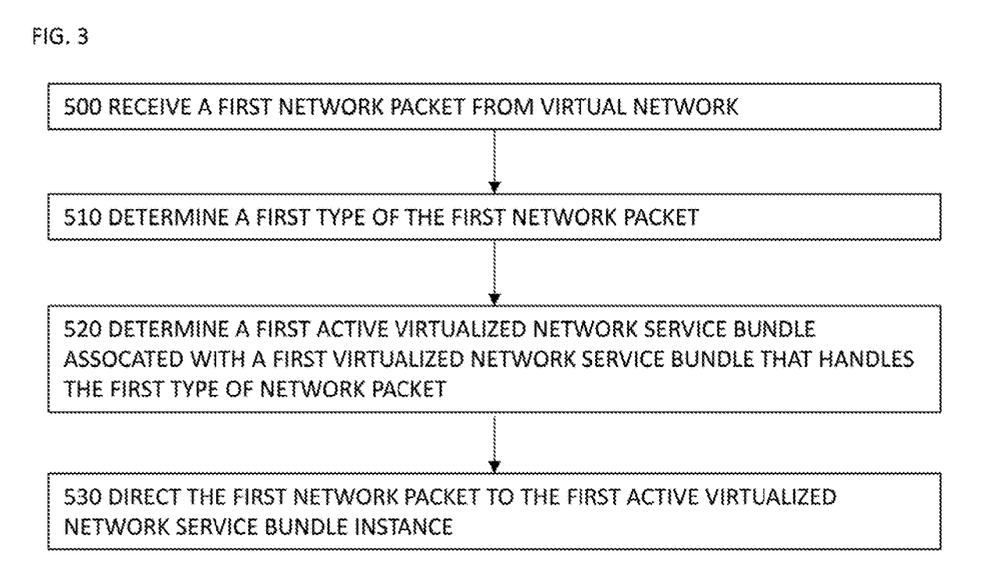
FIG. 3 is a flow diagram depicting an example method for managing virtualized network service bundles.
Figure 4:
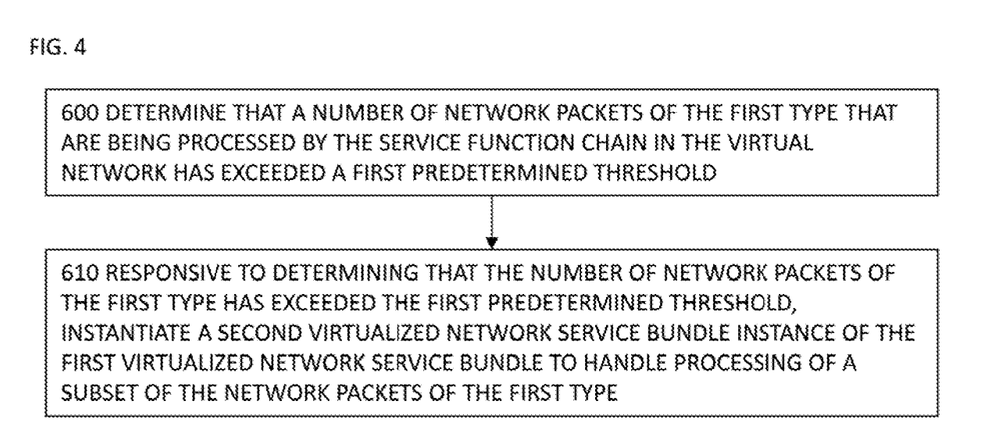
FIG. 4 is a flow diagram depicting an example method for managing virtualized network service bundles.
Figure 5:
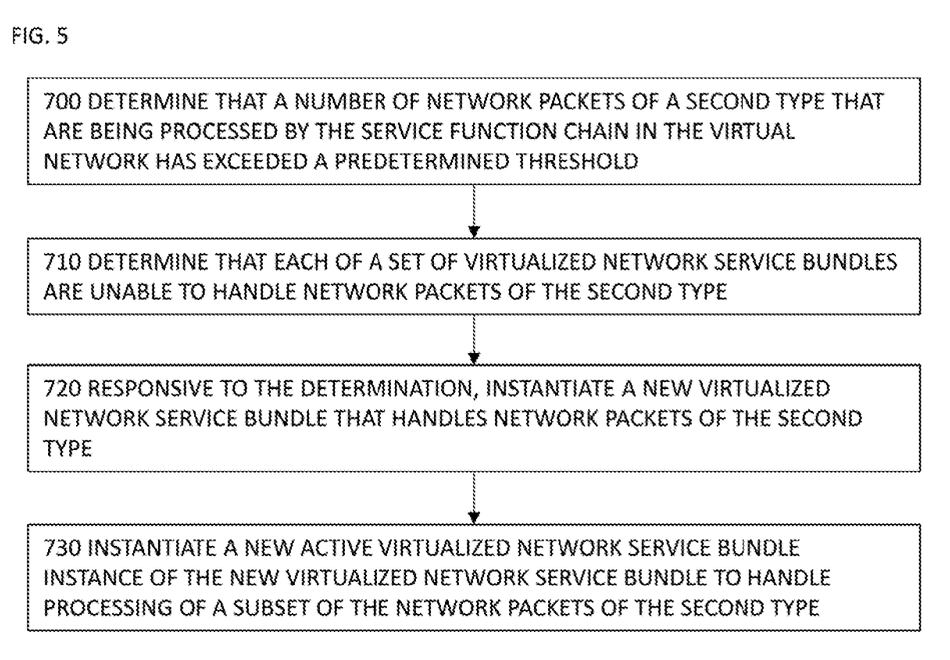
FIG. 5 is a flow diagram depicting an example method for managing virtualized network service bundles.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

In some example deployments of large carrier-grade systems, network service functions may execute on purpose-built hardware systems with dedicated memory and CPU resources. These purpose-built hardware systems may be connected via high speed links in data centers. Since the system is purpose-built to handle predefined network functions and workload, the deployment may be optimized to meet the service requirements of the system. This may include allocating adequate resources and carefully placing network functions to meet latency requirements. In these deployments, network functions that comprise a service function chain ("SFC") may be deployed in the same data center, and may be carefully configured to meet end-to-end quality of Service (QoS) requirements.

Network Functions Virtualization ("NFV") involves replacing these example deployments of expensive and inflexible network hardware with network services that operate virtually on commodity hardware. NFV increases resource efficiency usage and deployment of new services in a network. The deployment of these new services within the NFV system refers to the implementation of virtualized network functions (VNFs). The VNFs are responsible for handling specific network functions that run on one or multiple virtual machines or other virtualization technologies like containers in the NFV system.

Network Functions Virtualization ("NFV") has enabled dynamic placement and allocation of resources for network services to match workload requirements. NFV relies on commercial off the shelf hardware and software-defined/configurable dynamic data center connectivity to dynamically deploy network services. Network services may be scaled by dynamically adding virtualized instances of network functions to existing virtual network service function chains using virtualization and programmable networking technologies (e.g., software defined networking, among others).

Virtual network functions (VNFs) may comprise one or multiple virtual machines or other virtual component hosted by a hardware element in the NFV system. Virtualized network functions as described herein, includes those network functions and/or network services that are performed in a virtualized manner. Accordingly, VNFs may comprise virtualized tasks formerly carried out by dedicated hardware in which a service carrier injects a network service and/or function between nodes during packet transportation. VNFs may include, by way of example, internal tracking, load balancer, firewalls, network address translation, inspection, deep packet inspection (DPI), encryption, decryption, quality of service (QoS), network forwarding policy, layer 4-7 switching, IP forwarding, virtual LAN switching, among many others.

In some examples, an NFV system supports service function chains to facilitate execution of an application or transaction. A service function chain may comprise an ordered association of virtualized network functions to provide a chain of functions that support execution of an application, transaction, or protocol. The VNFs in a service function chain may be virtually interconnected through the NFV system and network to facilitate execution of the service function chain.

As such, a service function chain may involve multiple virtual network functions to carry out an application, transaction, or protocol of the service function chain. Correspondingly, a single request for the transaction, protocol, or application of the service function chain may involve the exchange of a pre-defined set of multiple messages across a subset of virtual network functions of the service function chain.

A technical challenge exists in handling the exchange of the multiple messages across the service function chain. The multiple instances of virtual network functions of a service function chain may not be restricted as to their single location, and may be located in the same or disparate racks or even different data centers. Accordingly, a request that results in multiple message exchanges among these virtual network functions may suffer from end-to-end latency issues. A delay, exceeding end-to-end latency requirement, incurred by any interconnecting link between instances of two virtual network functions can result in several message drops or re-transmissions. To compound that technical challenge, latency-sensitive messages may be aggressively re-transmitted by virtual network functions to ensure timely execution of the transaction/request handled by the service function chain, which may further aggravate network conditions, exacerbate end to end ("e2e") latency of the service function chain, and result in deteriorating quality of service. Every protocol, application or transaction may constitute different kinds of requests and identify a plurality of virtual network function service bundles and chains.

A technical solution to these technical challenges may efficiently manage virtualized network service bundles that implement service function chains, where each bundle may comprise a first set of virtual network functions. Each instance of a virtualized network service bundle may be instantiated using lightweight virtualization technology (e.g., by using containers, virtual machines, and/or other lightweight virtualization technology).

Each virtualized network service bundle may be associated with a service function chain and may facilitate execution of a transaction, application, protocol, and/or other bounded functionality. A virtualized network service bundle may comprise an identifier, a set of identifiers of active virtualized network service bundle instances, information about an ordered set of virtual network functions associated with the bundle, information about a transaction type associated with the virtualized network service function, information about an ordered set of messages that are transmitted between the virtual network functions to facilitate execution of the transaction, application, protocol, and/or other bounded functionality of the service function chain, a status identifier, a storage identifier that identifies a storage associated with the virtualized network service bundle and its active instances, and/or other components for facilitating management or use of the virtualized network service bundle.

By instantiating an instance of the virtualized network service bundle using lightweight virtualization technology, the resource footprint of the virtualization technology may be reduced. Further, the use of the lightweight virtualization technology may facilitate instantiation of virtual network functions associated with the service function chain corresponding to the bundle in a close proximity. The close proximity of the virtual network functions, and the association of the virtual network functions with each other via the lightweight virtualization technology, may facilitate a reduced end to end latency for processing transactional messages assigned to the service function chain of associated virtual services bundle.

The virtualized network service bundles (and their instantiations) may be managed to distribute workload across active instances of the virtualized network service bundles and the resources being used to facilitate the virtualized network service bundles. For example, the virtualized network service bundles (and their instantiations) may be created, managed, and/or deleted based on the volume and rate of transactions (and corresponding message exchanges) occurring in the NFV system. As such, all messages involved in a single transaction may be handled by a single instance of a virtualized network service bundle that handles transactions of the same type as the single transaction. In another example, each instance of a virtualized network service bundle may store information in a shared memory to facilitate management of the instances of the virtualized network service bundle.

As described above (and further described below), examples discussed herein address the technical challenges of end-to-end latency for service function chains by providing a technical solution that provides managing virtualized network service bundles. For example, a physical processor may implement machine readable instructions to receive a first data packet in a virtual network, determine a first type of the first data packet, determine a first active virtualized network service bundle instance associated with a first virtualized network service bundle that handles the first type of data packet, and direct the first data packet to the first active virtualized network service bundle instance. In some examples, the first virtualized network service bundle may comprise a first set of virtual network functions, and the first virtualized network service bundle may be associated with a set of active virtualized network service bundles instances, where the set of active virtualized network service bundle instance may comprise the first active virtualized network service bundle instance.

Figure 1:
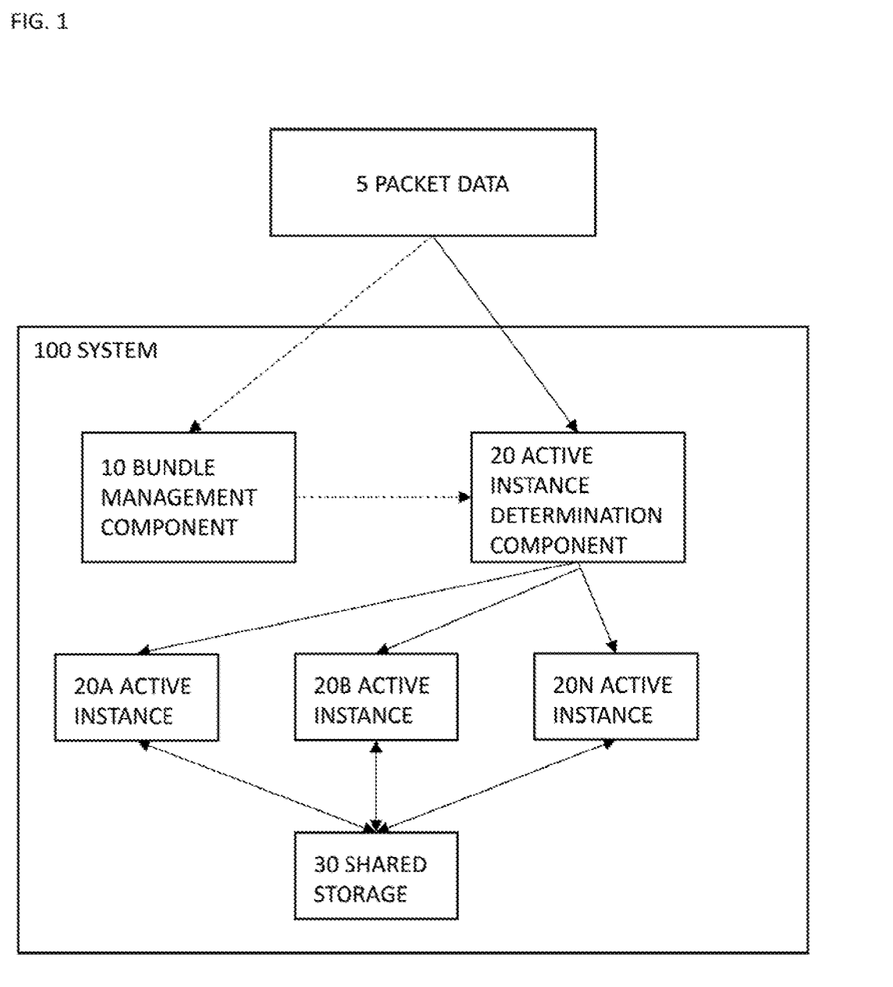
FIG. 1 is a block diagram depicting an example environment in which various examples may be implemented as a system that manages virtualized network service bundles.

FIG. 1 is an example environment in which various examples may be implemented as a system 100 that manages virtualized network service bundles. In some examples, system 100 that manages virtualized network service bundles may include various components such as a bundle management component 10, an active instance determination component 20, a set of active bundle instances 20A, 20B, . . . , 20N, a shared storage 30, and/or other components that facilitate management of virtualized network service bundles. Each component described in relation to FIG. 1 may comprise programmable hardware and/or may be facilitated by lightweight virtualization technology. In some examples, system 100 may be located in a single rack, may have components located in different racks in a single data center, may have components located in disparate data centers, and/or may be otherwise situated.

The system 100 may comprise one or more hardware elements that comprise a physical processor that implements machine readable instructions to facilitate management of the virtualized network service bundles. Physical processor 110 may be at least one central processing unit (CPU), microprocessor, and/or other hardware device suitable for performing the functionality described in relation to FIGS. 1-2B

As shown in FIG. 1, system 100 may receive data packets 5 via the network of the data center(s) that are included in the NFV system. The data packets 5 may be received by the active instance determination component 20. In some examples, as described below, the bundle management component 10 may also receive the data packets.

The bundle management component 10 may manage the virtualized network service bundles in the NFV system. For example, the bundle management component 10 may create, maintain, delete, and/or otherwise manage the virtualized network service bundles and respective instances in the NFV system. As part of that management, the bundle management component 10 may determine workloads in the NFV system and analyze whether Quality of Service requirements (e.g. end-to-end latencies) related to those workloads are met. In some examples, the bundle management component 10 may analyze transaction rate, request rate, transmission rate of messages of a same type, and/or other workload parameters for a given protocol, application or any other deployment scenario in the NFV system to determine which virtualized network functions should be associated together as a virtualized network service bundle that handles bounded functionality related to the associated virtual network functions. For example, the bundle management component 10 may compare transaction rate, request rate, transmission rate, and/or other workload parameters against predetermined thresholds for quality of service, latency, and/or other network characteristics to determine whether new virtualized network service bundles should be created, deleted, and/or otherwise managed.

In some examples, and as shown by the dashed lines in FIG. 1, the bundle management component 10 may determine new virtualized network service bundles based on traffic flow in the VNF network. For example, the bundle management component 10 may track the data packets being received to determine whether the active virtualized network service bundles and active network service bundle instances are sufficient to handle the network traffic and ensure QoS and latency requirements of the workload of the NFV system are being met. As part of that analysis, the bundle management component 10 may analyze data packets being transmitted and/or transactions or applications being performed in the NFV system.

In some examples, the bundle management component 10 may determine, a new virtualized network service bundle associated with transaction of the first type. The bundle management component 10 may determine which virtual network functions are associated with the transaction of the first type and may include those virtual network functions in the new virtualized network service bundle. Further, in identifying a new virtualized network service bundle, the bundle management component 10 may determine transactional boundaries for the requests and/or transactions of the new virtualized network service bundle. The transactional boundary of the new virtualized network service bundle may comprise the virtual network functions associated with the transaction. As such, data packets related to transactions of the first type may be handled by the same instance of the new virtualized network service bundle.

For the new virtualized network service bundle, the bundle management component 10 may also determine what information from the transaction and/or service function chain and data packets transmitted therein to store in a shared state store across all instances of the new virtualized network service bundle. For example, the bundle management component 10 may determine which state information may be persistent across transactions to store in the shared storage.

Responsive to generating the new virtualized network service bundle, the bundle management component 10 may store information about the new virtualized service bundle in a storage of the NFV system. In some examples, the bundle management component 10 may create, based on a transaction rate of transactions of a first type exceeding a predetermined threshold, a new virtualized network service bundle instance associated with transactions of the first type.

In some examples, the bundle management component 10 may determine whether a received data packet is associated with a virtualized network service bundle. In some examples, the bundle management component 10 may determine a transaction type associated with the data packet and may determine a virtualized network service bundle that handles transactions of the transaction type. In other examples, the bundle management component 10 may determine whether the received data packet is associated with a virtualized network service bundle by analyzing a payload or metadata associated with the received data packet and information about the associated virtual network functions with which the received data packet is associated. In these other examples, the bundle management component 10 may compare the information determined from the received packet with stored information associated with a virtualized network service bundle instance to determine if the received data packet is associated with a virtualized network service bundle instance.

Responsive to determining that the received network data packet is associated with a virtualized network service bundle, the bundle management component 10 may analyze transaction rates and/or other workload parameters related to transactions of a same type as transactions associated with the virtualized network service bundle and may determine, based on the transaction rate and/or other workload parameters exceeding predetermined thresholds, whether to instantiate a new virtual network service bundle instance, delete an existing bundle instance, or maintain the status quo of bundle instances.

For example, responsive to determining that the transaction rate and/or other workload parameters have exceeded a predetermined threshold number within a predetermined time period, the bundle management component 10 may instantiate a new instance of the virtualized network service bundle with which the received data packet is associated. The bundle management component 10 may instantiate a new instance of the virtualized network service bundle by instantiating a set of virtual network functions associated with the virtualized network service bundle. The bundle management component 10 may instantiate the set of virtual network functions such that they are co-located (e.g., in a same rack, in a same data center, and/or otherwise co-located). In some examples, the bundle management component 10 may instantiate the set of virtual network functions of the virtualized network service bundle instance such that an end to end latency of the set of virtual network functions is below a predetermined threshold.

In another example, responsive to determining that the transaction rate and/or other workload parameters have decreased below another predetermined threshold number within the predetermined time period, the bundle management component 10 may mark an active virtualized network service bundle instance for deletion. The bundle management component 10 may mark the active instance for deletion by changing the status identifier associated with the active instance to indicate the active instance is marked for deletion.

Responsive to determining that the received data packet is not associated with a virtualized network service bundle (e.g., based on the information determined from the received data packet not matching any stored information associated with the virtualized network service bundles, a transaction type of the data packet not matching any transaction types of existing virtualized network service bundles, etc.), the bundle management component 10 may determine whether transaction rate of the transaction type of the data packet has exceeded a predetermined threshold within a predetermined time. Responsive to determining that the transaction rate has exceeded the predetermined threshold within the predetermined time period, the bundle management component 10 may generate a new virtualized network service bundle to handle transactions that include transmission of data packets with a same transaction type as the received data packet.

The bundle management component 10 may create a new virtualized network service bundle in a manner the same as or similar to that described above. Responsive to generating the new virtualized network service bundle, the bundle management component 10 may store information about the new virtualized service bundle in a storage of the NFV system. The bundle management component 10 may also instantiate a new instance of the new virtualized network service bundle that handles the received data packet.

As mentioned above, the active instance determination component 20 may also receive the data packets 5. The active instance determination component 20 may determine whether a received data packet is associated with a virtualized network service bundle. In some examples, the active instance determination component 20 may make this determination in a manner the same as or similar to the bundle management component 10, as described above.

In some examples, the active instance determination component 20 may determine an instance of the active instances 20A, 20B, . . . , 20N of the virtualized network service bundle along with determining the virtualized network service bundle. The active instance determination component 20 may determine the active instance 20N of the determined virtualized network service bundle based on whether the data packet is part of a transaction already being handled by the instance 20N. In some examples, the active instance determination component 20 may determine the active instance 20N by determining whether a transaction identifier associated with the data packet matches a transaction identifier associated with the active instance 20N.

In some examples, the active instance component may determine that the data packet may not match any active instances. In these examples, active instance determination component 20 may determine the active instance 20N based on the data packet being a first data packet in a new transaction and based on load balancing packets among the active instances 20A, 20B, . . . , 20N of the determined virtualized network service bundle. In this example, the active instance determination component 20 may determine that the number of data packets being handled by active instance 20N may exceed a predetermined threshold in a predetermined amount of time, and/or the number of data packets being handled by all of the active instances 20A, 20B, . . . , 20N may exceed a predetermined threshold in a predetermined amount of time, and may instantiate a new instance of the virtualized network service bundle.

In examples in which the determined active instance 20N is marked for deletion, the active instance determination component 20 may determine a second active instance (e.g., instance 20B) of the virtualized network service bundle to which to relocate the data packets associated with the active instance 20N. The active instance determination component 20 may relocate the associated data packets to active instance 20B and may direct the received data packet to active instance 20B as well.

According to various implementations, a system that manages virtualized network service bundles and the various components described herein may be implemented in hardware and/or a combination of hardware and programming that configures hardware. Furthermore, in FIG. 1 and other Figures described herein, different numbers of components or entities than depicted may be used.

Figure 1A:
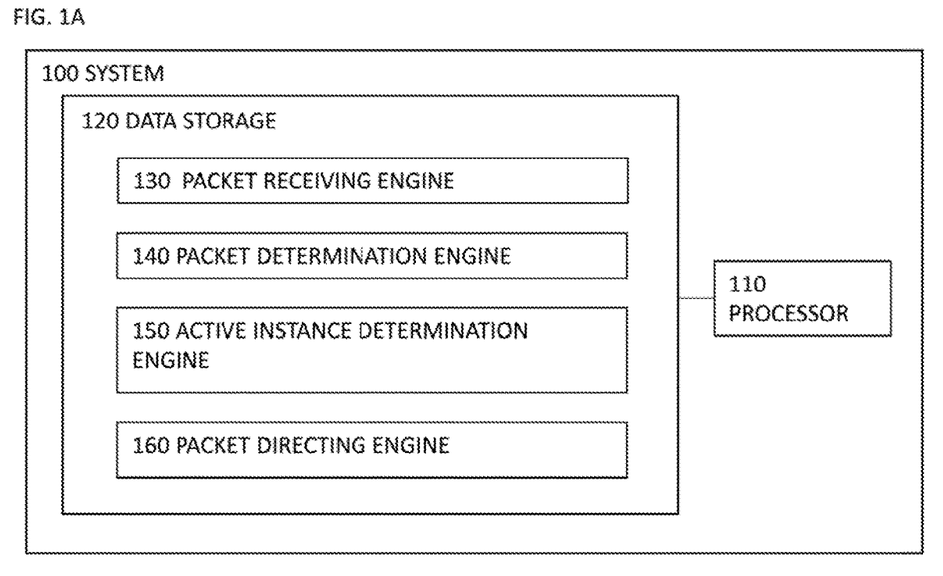
FIG. 1A is a block diagram depicting an example system for managing virtualized network service bundles.

FIG. 1A is a block diagram depicting an example system 100A for managing virtualized network service bundles. In some examples, the example system 100A may comprise the system 100 of FIG. 1. System 100A, which manages virtualized network service bundles, may comprise a physical processor 110, a packet receiving engine 130, a packet determination engine 140, an active instance determination engine 150, packet directing engine 160, and/or other engines. In some examples, engines 130-160 may represent components 10-30, respectively. The term "engine", as used herein, refers to a combination of hardware and programming that performs a designated function. As is illustrated with respect to FIGS. 1A-1B, the hardware of each engine, for example, may include one or both of a physical processor and a machine-readable storage medium, while the programming is instructions or code stored on the machine-readable storage medium and executable by the physical processor to perform the designated function.

Packet receiving engine 130 may receive a data packet in the network. In some examples, packet receiving engine 130 may receive the data packet in the network in a manner similar to or the same as that described above in relation to system 100 of FIG. 1.

The packet determination engine 140 may determine a first type of the data packet. In some examples, packet determination engine 140 may determine the first type of the data packet in the network in a manner similar to or the same as that described above in relation to system 100 and/or active instance determination component 20 of FIG. 1.

Active instance determination engine 150 may determine a first active virtualized network service bundle instance associated with a first virtualized network service bundle that handles the first type of data packet. In some examples, the active instance determination engine 150 may determine that data packets involved in the same transaction as the first data packet should be directed to the first active virtualized network service bundle as well. As described above, in some examples, the first virtualized network service bundle may comprise a first set of virtual network functions, where the first virtualized network service bundle is associated with a set of active virtualized network service bundles instances and the set of active virtualized network service bundle instances comprising the first active virtualized network service bundle instance. In some examples, active instance determination engine 150 may determine the first active virtualized network service bundle in a manner similar to or the same as that described above in relation to system 100 and/or active instance determination component 20 of FIG. 1.

Packet directing engine 160 may direct the data packet to the first active virtualized network service bundle instance. In some examples, packet directing engine 160 may direct the data packet in a manner similar to or the same as that described above in relation to system 100 and/or active instance determination component 20 of FIG. 1.

System 100A may also manage the virtualized network service bundles in a manner the same as or similar to that described above in relation to system 100 and/or bundle management component 10 as well. For example, system 100A may manage a set of virtualized network service bundle instances of the first virtualized network service bundle based on a number of data packets of the first type being processed by the service function chain. As part of this management, system 100A may store information related to the set of virtualized network service bundle instances of the first virtualized network service bundle in a shared non-transitory machine readable storage medium.

System 100A may also instantiate new active virtualized network service bundles and bundle instances. For example, system 100A may determine that a number of data packets of a second type that are being processed by the service function chain in the virtual network bundle has exceeded a predetermined threshold. System 100A may also determine that each of the set of virtualized network service bundles are unable to handle data packets of the second type with required QoS parameters. Responsive to the determination, system 100A may instantiate a new virtualized network service bundle to handle data packets of the second type and instantiate a new active virtualized network service bundle instance of the new virtualized network service bundle to handle processing of a subset of the data packets of the second type. In another example, system 100A may determine the set of virtualized network service bundles by analyzing workload parameters related to transactions in the network and determining that workload parameters related to a set of transactions have exceeded predetermined thresholds. System 100 A may determine the set of virtualized network service bundles by creating a network service bundle associated with each unique transaction type of the set of transactions. System 100A may determine the set of virtualized network service bundles by determining, for each new virtualized network service bundle, an associated set of virtual network functions and a set of transactional boundaries for a corresponding transaction associated with the virtualized network service bundle and a set of state information that may persist across transactions and may be shared across a set of virtualized network service bundles.

System 100A may also manage the virtualized network service bundle instances. For example, system 100A may determine that a number of data packets of the first type that are being processed by the service function chain in the virtual network has exceeded a first predetermined threshold, and, responsive to determining that the number of data packets of the first type has exceeded the first predetermined threshold, may instantiate a second virtualized network service bundle instance of the first virtualized network service bundle to handle processing of a subset of the data packets of the first type. In another example, system 100A may relocate a set of data packets involved in the same transaction to a second active instance of the first virtualized network service bundle based on the first active virtualized network service bundle instance being marked for deletion.

In performing their respective functions, engines 130-160 may access storage medium 120 and/or other suitable database(s). Storage medium 120 may represent any memory accessible to the system 100A that can be used to store and retrieve data. Storage medium 120 and/or other databases communicably coupled to the system may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. The system 100A that manages virtualized network service bundles may access storage medium 120 locally or remotely via a network.

Storage medium 120 may include a database to organize and store data. The database may reside in a single or multiple physical device(s) and in a single or multiple physical location(s). The database may store a plurality of types of data and/or files and associated data or file description, administrative information, or any other data.

Figure 1B:
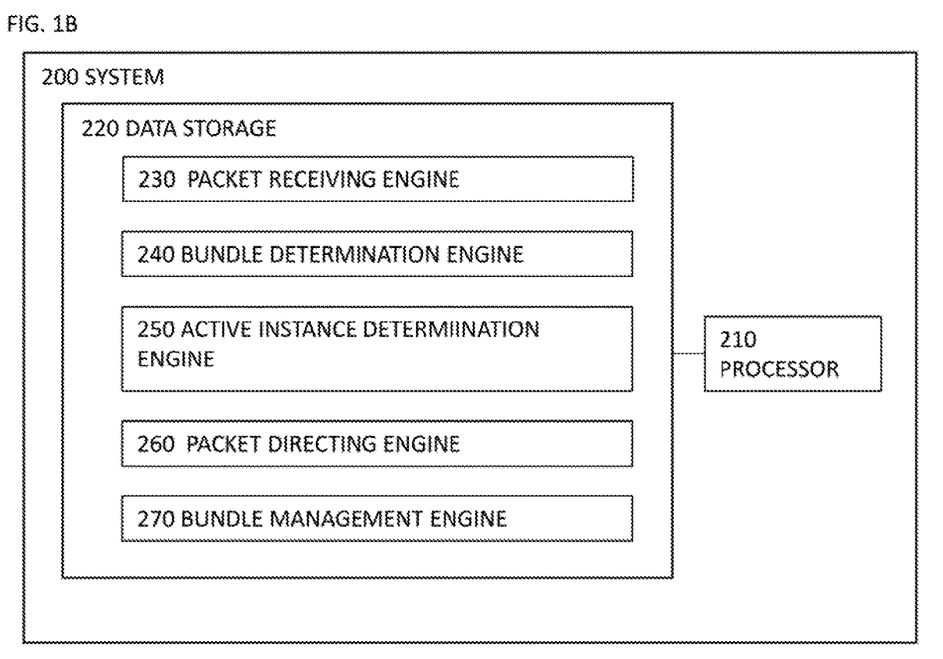
FIG. 1B is a block diagram depicting an example system for managing virtualized network service bundles.

FIG. 1B is a block diagram depicting an example system 200 that manages virtualized network service bundles. In some examples, example system 200 may comprise system 100 of FIG. 1. System 200, which may facilitate managing virtualized network service bundles may comprise a physical processor 210, packet receiving engine 230, a packet determination engine 240, an active instance determination engine 250, a packet directing engine 260, a bundle management engine 270, and/or other engines. In some examples, engines 230-270 represent engines 130-160 and the functionality described in relation to system 100A, respectively.

Figure 2A:
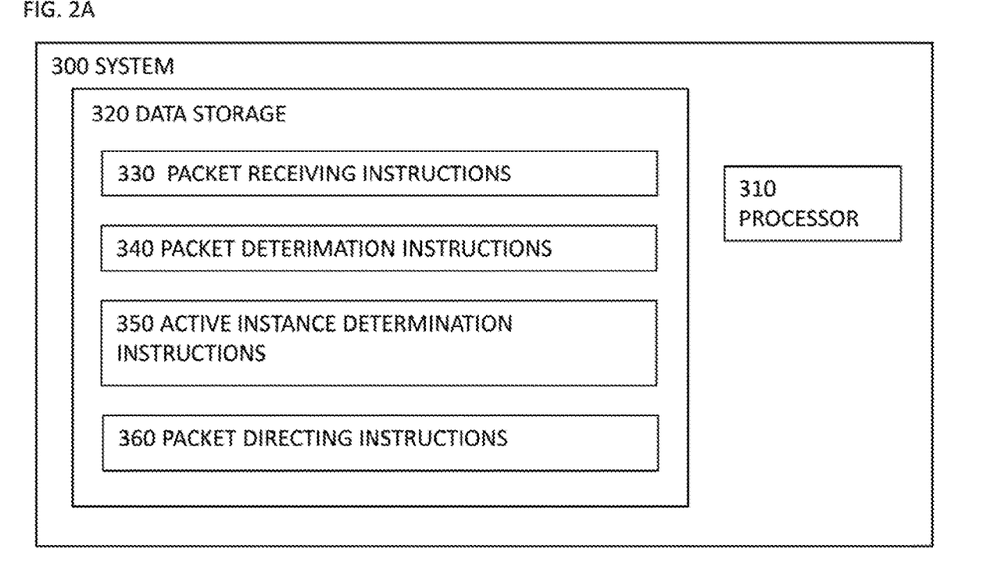
FIG. 2A is a block diagram depicting an example system for managing virtualized network service bundles.

FIG. 2A is a block diagram depicting an example machine-readable storage medium 320 comprising instructions executable by a processor for managing virtualized network service bundles.

In the foregoing discussion, engines 130-160 were described as combinations of hardware and programming. Engines 130-160 may be implemented in a number of fashions. Referring to FIG. 2A, the programming may be processor executable instructions 330-352 stored on a machine-readable storage medium 320 and the hardware may include a first processor 310 for executing those instructions. Thus, machine-readable storage medium 320 can be said to store program instructions or code that when executed by first processor 310 implements a system that manages virtualized network service bundles of FIG. 1.

In FIG. 2A, the executable program instructions in machine-readable storage medium 320 are depicted as packet receiving instructions 330, packet determination instructions 340, active instance determination instructions 350, packet directing instructions 360, and/or other instructions. Instructions 330-360 represent program instructions that, when executed, cause first processor 310 to implement engines 130-160, respectively.

Figure 2B:
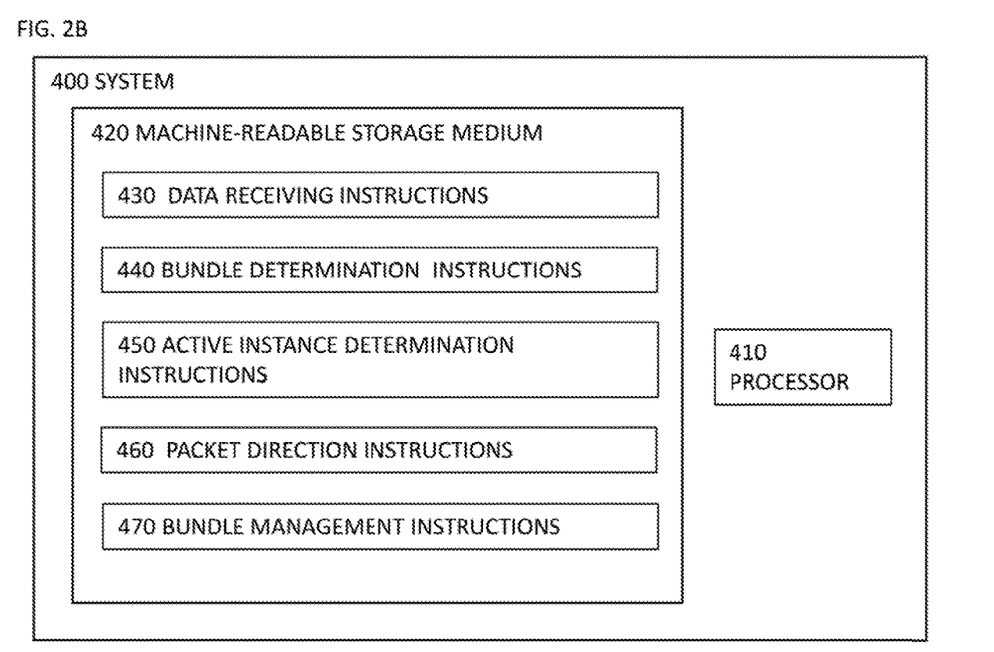
FIG. 2B is a block diagram depicting an example system for managing virtualized network service bundles.

FIG. 2B is a block diagram depicting an example machine-readable storage medium 420 comprising instructions executable by a processor for managing virtualized network service bundles.

In the foregoing discussion, engines 230-270 were described as combinations of hardware and programming. Engines 230-270 may be implemented in a number of fashions. Referring to FIG. 2B, the programming may be processor executable instructions 430-470 stored on a machine-readable storage medium 420 and the hardware may include a first processor 410 for executing those instructions. Thus, machine-readable storage medium 420 can be said to store program instructions or code that when executed by first processor 410 implements a system that manages virtualized network service bundles of FIG. 2B.

In FIG. 2B, the executable program instructions in machine-readable storage medium 420 are depicted as data receiving instructions 430, bundle determination instructions 440, active instance determination instructions 450, packet directing instructions 460, bundle management instructions 470, and/or other instructions. Instructions 430-370 represent program instructions that, when executed, cause first processor 410 to implement engines 230-270, respectively.

Machine-readable storage medium 320 (or machine-readable storage medium 420) may be any electronic, magnetic, optical, or other physical storage device that contains or stores executable instructions. In some implementations, machine-readable storage medium 320 (or machine-readable storage medium 420) may be a non-transitory storage medium, where the term "non-transitory" does not encompass transitory propagating signals. Machine-readable storage medium 320 (or machine-readable storage medium 420) may be implemented in a single device or distributed across devices. Likewise, processor 310 (or processor 410) may represent any number of physical processors capable of executing instructions stored by machine-readable storage medium 320 (or machine-readable storage medium 420). Processor 310 (or processor 410) may be integrated in a single device or distributed across devices. Further, machine-readable storage medium 320 (or machine-readable storage medium 420) may be fully or partially integrated in the same device as processor 310 (or processor 410), or it may be separate but accessible to that device and processor 310 (or processor 410).

In one example, the program instructions may be part of an installation package that when installed can be executed by processor 310 (or processor 410) to implement a system that manages virtualized network service bundles. In this case, machine-readable storage medium 320 (or machine-readable storage medium 420) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 (or machine-readable storage medium 420) may include a hard disk, optical disk, tapes, solid state drives, RAM, ROM, EEPROM, or the like.

Processor 310 may be at least one central processing unit (CPU), microprocessor, and/or other hardware device suitable for retrieval and execution of instructions stored in machine-readable storage medium 320. Processor 310 may fetch, decode, and execute program instructions 330-360, and/or other instructions. As an alternative or in addition to retrieving and executing instructions, processor 310 may include at least one electronic circuit comprising a number of electronic components for performing the functionality of at least one of instructions 330-360, and/or other instructions.

Processor 410 may be at least one central processing unit (CPU), microprocessor, and/or other hardware device suitable for retrieval and execution of instructions stored in machine-readable storage medium 420. Processor 410 may fetch, decode, and execute program instructions 430-470, and/or other instructions. As an alternative or in addition to retrieving and executing instructions, processor 410 may include at least one electronic circuit comprising a number of electronic components for performing the functionality of at least one of instructions 430-470, and/or other instructions.

FIG. 3 is a flow diagram depicting an example method for managing virtualized network service bundles. The various processing blocks and/or data flows depicted in FIG. 3 (and in the other drawing figures such as FIGS. 4, 5) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 3 as illustrated (and described in greater detail below) is meant to be an example and, as such, should not be viewed as limiting. The method of FIG. 3 may be implemented in the form of executable instructions stored on a machine-readable storage medium, such as storage medium 420, and/or in the form of electronic circuitry.

In an operation 500, a first data packet may be received from virtual network. For example, the system 100 (and/or the packet receiving engine 130, the packet receiving instructions 330, or other resource of the system 100) may receive the first data packet. The system 100 may receive the data packet in a manner similar or the same as that described above in relation to the execution of the packet receiving engine 130, the packet receiving instructions 330, and/or other resource of the system 100.

In an operation 510, a first type of the first data packet may be determined. For example, the system 100 (and/or the packet determination engine 140, the packet determination instructions 340 or other resource of the system 100) may determine the first type of the first data packet. The system 100 may determine the first type of the first data packet in a manner similar or the same as that described above in relation to the execution of the packet determination engine 140, the packet determination instructions 340, and/or other resource of the system 100.

In an operation 520, a first active virtualized network service bundle instance associated with a first virtualized network service bundle that handles the first type of data packet may be determined. For example, the system 100 (and/or the active instance determination engine 150, the active instance determination instructions 350 or other resource of the system 100) may determine the first active virtualized network service bundle instance. In some examples, the first virtualized network service bundle may comprise a first set of virtual network functions, and the first virtualized network service bundle may be associated with a set of active virtualized network service bundles instances, where the set of active virtualized network service bundle instances comprising the first active virtualized network service bundle instance. The system 100 may determine the first active virtualized network service bundle instance in a manner similar or the same as that described above in relation to the execution of the active instance determination engine 150, the active instance determination instructions 350, and/or other resource of the system 100.

In an operation 530, the first data packet may be directed to the first active virtualized network service bundle instance. For example, the system 100 (and/or the packet directing engine 160, the packet directing instructions 360, or other resource of the system 100) may direct the first data packet to the first active virtualized network service bundle instance. The system 100 may direct the first data packet to the first active virtualized network service bundle instance in a manner similar or the same as that described above in relation to the execution of the packet directing engine 160, the packet directing instructions 360, and/or other resource of the system 100.

FIG. 4 is a flow diagram depicting an example method for managing virtualized network service bundles. The method of FIG. 4 as illustrated (and described in greater detail below) is meant to be an example and, as such, should not be viewed as limiting. The method of FIG. 4 may be implemented in the form of executable instructions stored on a machine-readable storage medium, such as storage medium 420, and/or in the form of electronic circuitry.

In an operation 600, a determination may be made that a number of data packets of the first type that are being processed by the service function chain in the virtual network has exceeded a first predetermined threshold. For example, the system 100 (and/or the bundle management engine 270, the bundle management instructions 470, or other resource of the system 100) may determine that a number of data packets of the first type that are being processed by the service function chain in the virtual network has exceeded a first predetermined threshold. The system 100 may determine that a number of data packets of the first type that are being processed by the service function chain in the virtual network has exceeded a first predetermined threshold in a manner similar or the same as that described above in relation to the execution of the bundle management engine 270, the bundle management instructions 470, and/or other resource of the system 100.

In an operation 610, a second virtualized network service bundle instance of the first virtualized network service bundle may be instantiated to handle processing of a subset of the data packets of the first type, responsive to determining that the number of data packets of the first type has exceeded the first predetermined threshold. For example, the system 100 (and/or the bundle management engine 270, the bundle management instructions 470, or other resource of the system 100) may instantiate a second virtualized network service bundle instance of the first virtualized network service bundle. The system 100 may instantiate a second virtualized network service bundle instance of the first virtualized network service bundle in a manner similar or the same as that described above in relation to the execution of the bundle management engine 270, the bundle management instructions 470, and/or other resource of the system 100.

FIG. 5 is a flow diagram depicting an example method for managing virtualized network service bundles. The method of FIG. 5 as illustrated (and described in greater detail below) is meant to be an example and, as such, should not be viewed as limiting. The method of FIG. 5 may be implemented in the form of executable instructions stored on a machine-readable storage medium, such as storage medium 420, and/or in the form of electronic circuitry.

In an operation 700, determination may be made that a number of data packets of a second type that are being processed by the service function chain in the virtual network has exceeded a predetermined threshold. For example, the system 100 (and/or the bundle management engine 270, the bundle management instructions 470, or other resource of the system 100) may determine that a number of data packets of a second type that are being processed by the service function chain in the virtual network has exceeded a predetermined threshold. The system 100 may determine that a number of data packets of a second type that are being processed by the service function chain in the virtual network has exceeded a predetermined threshold in a manner similar or the same as that described above in relation to the execution of the bundle management engine 270, the bundle management instructions 470, and/or other resource of the system 100.

In an operation 710, a determination may be made that each of the set of virtualized network service bundles are unable to handle data packets of the second type. For example, the system 100 (and/or the bundle management engine 270, the bundle management instructions 470, or other resource of the system 100) may determine that each of the set of virtualized network service bundles are unable to handle data packets of the second type. The system 100 may determine that each of the set of virtualized network service bundles are unable to handle data packets or corresponding transaction/request of the second type in a manner similar or the same as that described above in relation to the execution of the bundle management engine 270, the bundle management instructions 470, and/or other resource of the system 100.

In an operation 720, a new virtualized network service bundle to handle data packets of the second type may be instantiated responsive to the determination of operation 710. For example, the system 100 (and/or the bundle management engine 270, the bundle management instructions 470, or other resource of the system 100) may instantiate a new virtualized network service bundle to handle data packets of the second type. The system 100 may instantiate a new virtualized network service bundle to handle data packets of the second type in a manner similar or the same as that described above in relation to the execution of the bundle management engine 270, the bundle management instructions 470, and/or other resource of the system 100.

In an operation 730, a new active virtualized network service bundle instance of the new virtualized network service bundle may be instantiated to handle processing of a subset of the data packets of the second type. For example, the system 100 (and/or the bundle management engine 270, the bundle management instructions 470, or other resource of the system 100) may instantiate a new active virtualized network service bundle instance of the new virtualized network service bundle to handle processing of a subset of the data packets of the second type. The system 100 may instantiate a new active virtualized network service bundle instance of the new virtualized network service bundle to handle processing of a subset of the data packets of the second type in a manner similar or the same as that described above in relation to the execution of the bundle management engine 270, the bundle management instructions 470, and/or other resource of the system 100.

The foregoing disclosure describes a number of example implementations for managing virtualized network service bundles. The disclosed examples may include systems, devices, computer-readable storage media, and methods for managing virtualized network service bundles. For purposes of explanation, certain examples are described with reference to the components illustrated in FIGS. 1-5. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for managing virtualized network service bundles in a service function chain, the method being implemented by a physical processor implementing machine readable instructions, the method comprising:
   receiving a first data packet in a virtual network in the service function chain;
   determining a first type of the first data packet;
   determining a first active virtualized network service bundle instance associated with a first virtualized network service bundle that handles the first type of data packet, wherein the first virtualized network service bundle comprises a first set of virtual network functions, and wherein the first virtualized network service bundle is associated with a set of active virtualized network service bundle instances, the set of active virtualized network service bundle instances comprising the first active virtualized network service bundle instance;
   directing the first data packet to the first active virtualized network service bundle instance; and
   managing a set of virtualized network service bundle instances of the first virtualized network service bundle based on a number of data packets of the first type being processed by the service function chain.

2. The method of claim 1, further comprising:
   determining that a number of data packets of the first type that are being processed by the service function chain in the virtual network has exceeded a first predetermined threshold;
   responsive to determining that the number of data packets of the first type has exceeded the first predetermined threshold, instantiating a second virtualized network service bundle instance of the first virtualized network service bundle to handle processing of a subset of the data packets of the first type.

3. The method of claim 1, further comprising:
   directing data packets involved in a same transaction as the first data packet to the first active virtualized network service bundle.

4. The method of claim 3, further comprising:
   relocating a set of data packets involved in the same transaction to a second active instance of the first virtualized network service bundle based on the first active virtualized network service bundle instance being marked for deletion.

5. The method of claim 1, further comprising:
   storing information related to the set of virtualized network service bundle instances of the first virtualized network service bundle in a shared non-transitory machine readable storage medium.

6. The method of claim 1, further comprising:
   determining that a number of data packets of a second type that are being processed by the service function chain in the virtual network has exceeded a predetermined threshold;
   determining that each of the set of virtualized network service bundles are unable to handle data packets of the second type;
   responsive to the determination, instantiating a new virtualized network service bundle to handle data packets of the second type; and
   instantiating a new active virtualized network service bundle instance of the new virtualized network service bundle to handle processing of a subset of the data packets of the second type.

7. The method of claim 1, further comprising:
   determining the set of virtualized network service bundles by analyzing a set of workload parameters related to a set of transactions in the network;
   determining that the set of workload parameter have exceeded a predetermined threshold;
   creating, for each unique transaction type associated with the set of transactions, a new virtualized network service bundle to handle transactions of the unique transaction type.

8. The method of claim 1, wherein determining the set of virtualized network service bundles comprises:
   for each virtualized network service bundle, determining a set of transactional boundaries for a corresponding transaction associated with the virtualized network service bundle; and
   for each virtualized network service bundle, determining an associated set of virtual network functions.

9. A non-transitory machine-readable storage medium comprising instructions executable by a physical processor of a computing device for managing virtualized network service bundles in a service function chain, the machine-readable storage medium comprising:
   instructions to receive a first data packet in a virtual network in the service function chain;
   instructions to determine a first virtualized network service bundle for the first data packet based on a first type of the first data packet and a first set of capabilities associated with the first virtualized network service bundle, wherein the first virtualized network service bundle comprises a first set of virtual network functions, and wherein the first virtualized network service bundle is associated with a set of active virtualized network service bundle instances, the set of active virtualized network service bundle instances comprising the first active virtualized network service bundle instance;
   instructions to direct the first data packet to a first active virtualized network service bundle instance associated with the first virtualized network service bundle;
   instructions to determine that a number of data packets of the first type that are being processed by the service function chain in the virtual network has exceeded a first predetermined threshold; and instructions to instantiate a second virtualized network service bundle instance of the first virtualized network service bundle to handle processing of a subset of the data packets of the first type, the instantiation being responsive to the instructions to determine that the number of data packets of the first type has exceeded the first predetermined threshold.

10. The non-transitory machine-readable storage medium of claim 9, further comprising:
instructions to determine that a number of data packets of the first type that are being processed by the service function chain in the virtual network has exceeded a first predetermined threshold;
instructions to, responsive to determining that the number of data packets of the first type has exceeded the first predetermined threshold, instantiate a second active virtualized network service bundle instance of the first virtualized network service bundle to handle processing of a subset of the data packets of the first type;
instructions to determine that a number of data packets of a second type that are being processed by the service function chain in the virtual network has exceeded a predetermined threshold;
instructions to determine that each of a set of virtualized network service bundles are unable to handle data packets of the second type;
instructions to, responsive to the determination, instantiate a new virtualized network service bundle to handle data packets of the second type; and
instructions to instantiate a new active virtualized network service bundle instance of the new virtualized network service bundle to handle processing of a subset of the data packets of the second type.

11. The non-transitory machine-readable storage medium of claim 9, further comprising:
instructions to direct data packets involved in a same transaction as the first data packet to the first active virtualized network service bundle instance.

12. The non-transitory machine-readable storage medium of claim 9, further comprising:
instructions to determine a new virtualized network service bundle by:
analyzing workload parameters related to transactions in the network;
determining that a workload parameter related to a first transaction of a first transaction type have exceeded a predetermined threshold;
creating the new virtualized network service bundle to handle transactions of the first transaction type;
determining an associated set of virtual network functions for the new virtualized network service bundle; and
determining a set of transactional boundaries for the first transaction type associated with the virtualized network service bundle.

13. The non-transitory machine-readable storage medium of claim 9, further comprising:
instructions to manage a set of virtualized network service bundles; instructions to manage, for each virtualized network service bundle, a set of active virtualized network service bundle instances;
instructions to manage a first set of active virtualized network service bundle instances of the first virtualized network service bundle based on the number of data packets of the first type being processed by the service function chain; and
instructions to store information related to the first set of active virtualized network service bundle instances of the first virtualized network service bundle in a shared non-transitory machine readable storage medium.

14. A system for managing virtualized network service bundles in a service function chain, the system comprising:
a physical processor that implements machine readable instructions that cause the system to:
receive a first data packet in a virtual network in the service function chain;
determine a first type of the first data packet;
determine a first active virtualized network service bundle instance associated with a first virtualized network service bundle that handles the first type of data packet, wherein the first virtualized network service bundle comprises a first set of virtual network functions, and wherein the first virtualized network service bundle is associated with a set of active virtualized network service bundle instances, the set of active virtualized network service bundle instances comprising the first active virtualized network service bundle instance;
direct the first data packet to the first active virtualized network service bundle instance; and
manage a set of active virtualized network service bundle instances of the first virtualized network service bundle based on the number of data packets of the first type being processed by the service function chain.

15. The system of claim 14, wherein the physical processor implements machine readable instructions to cause the system to:
determine that a number of data packets of the first type that are being processed by the service function chain in the virtual network has exceeded a first predetermined threshold;
responsive to determining that the number of data packets of the first type has exceeded the first predetermined threshold, instantiate a second instance of the first virtualized network service bundle to handle processing of a subset of the data packets of the first type.

16. The system of claim 14, wherein the physical processor implements machine readable instructions to cause the system to:
direct data packets involved in a same transaction as the first data packet to the first active virtualized network service bundle.

17. The system of claim 16, wherein the physical processor implements machine readable instructions to cause the system to:
determine the set of virtualized network service bundles by:
analyzing a set of workload parameters related to a set transactions in the network;
determining that the set of workload parameters have exceeded a predetermined threshold;
creating, for each unique transaction type associated with the set of transactions, a new virtualized network service bundle to handle transactions of the unique transaction type;
for each virtualized network service bundle, determining a set of transactional boundaries for a corresponding transaction associated with the virtualized network service bundle; and
for each virtualized network service bundle, determining an associated set of virtual network functions.

18. The system of claim 14, wherein the physical processor implements machine readable instructions to cause the system to:
store information related to the set of active virtualized network service bundle instances of the first virtualized network service bundle in a shared non-transitory machine readable storage medium.

19. The system of claim 14, wherein the physical processor implements machine readable instructions to cause the system to:
determine that a number of data packets of a second type that are being processed by the service function chain in the virtual network has exceeded a predetermined threshold;
determine that each of a set of virtualized network service bundles are unable to handle data packets of the second type;
responsive to the determination, instantiate a new virtualized network service bundle to handle data packets of the second type; and
instantiate a new active virtualized network service bundle instance of the new virtualized network service bundle to handle processing of a subset of the data packets of the second type.

20. The system of claim 14, wherein the physical processor implements machine readable instructions to cause the system to:
direct data packets involved in a same transaction as the first data packet to the first active virtualized network service bundle.

* * * * *